Nov. 6, 1934.                W. H. PECK                1,979,840
                          TELEVISION APPARATUS
                          Filed March 28, 1932
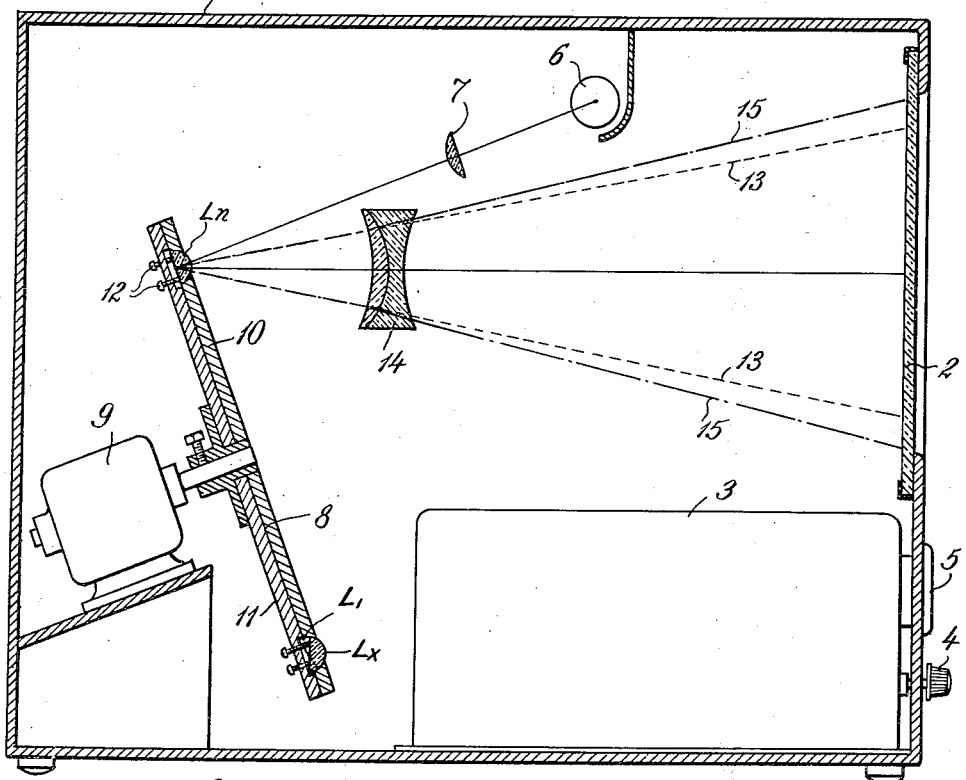
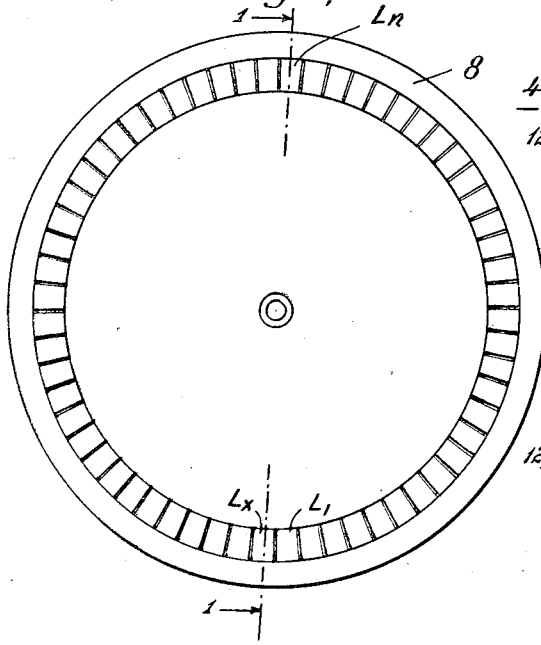
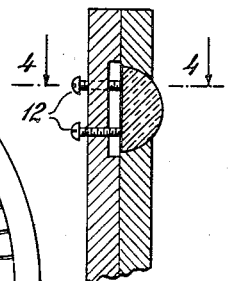
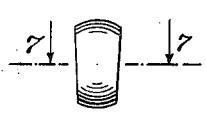
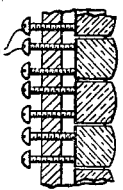
INVENTOR
William H. Peck
BY
Pennie, Davis, Marvin & Edmonds
ATTORNEYS Patented Nov. 6, 1934

1,979,840

UNITED STATES PATENT OFFICE 1,979,840

TELEVISION APPARATUS

William Hoyt Peck, Scarsdale, N. Y.

Application March 28, 1932, Serial No. 601,495

21 Claims. (Cl. 178—6)

The present invention relates to television systems, particularly to improvements in the scanning apparatus thereof. The principles of my invention are directly applicable both to the transmitting as well as the receiving portions of such systems.

In the system which I propose, scanning is effected by variable reflection of light rays in contrast with the usual aperture scanning. It differs fundamentally from existing systems operating on the principle of scanning by reflected rays in that a wide angle or aperture of scanning is obtainable which is not only substantially free from optical distortion, but in addition provides a resulting image definition far surpassing results heretofore obtainable at corresponding apertures.

Television systems are known in which plane, concave or cylindrical reflecting elements are employed for scanning. All such modifications are variously objectionable. Where plane mirror scanning elements are employed the scanning angle or aperture is substantially double the angle subtended upon the scanning disc or drum by the individual scanning elements. Accordingly the scanning aperture may be increased only by a decrease in the number of scanning elements. On the other hand image definition increases and optical distortion decreases in correspondence with the number of scanning elements, i. e. number of lines per scan. It will be seen from this that plane mirror scanning necessarily entails a compromise between the scanning aperture desired and the requisite image definition. Practical application of plane mirror scanning has established that passable image definition is obtainable only at scanning apertures which are too small to provide an image of appropriate dimensions at short distances from the scanning device, such for example as would be required in cabinet mounting for home use.

Resort to concave mirrors as scanning elements does not overcome the defects of plane mirror scanning, since the gain in aperture effected from imparting concave curvature to the scanning elements is more than offset by the marked increase in optical distortion. A concave mirror provides an optically correct image only when rays from an object are confined within a narrow pencil directed along the optical axis of the mirror. As the obliquity of the scanning beam with respect to the optical axis increases in the manner requisite for scanning, the optical distortion increases so rapidly that the result soon becomes unusable.

Cylindrical mirrors by their very construction are inherently distorting and thus not adapted to the formation of an optically correct image in television scanning.

I propose to overcome the defects noted by utilization of light reflecting elements comprising small convex lenses having one face mirrored for reflecting an impinging beam through the surface of admission of the lens. The effect upon an incident beam is that of a lens of double the thickness. This construction provides, as I shall explain, a means of increasing the scanning aperture to many times that obtainable with plane mirror scanning elements of corresponding dimensions, while at the same time avoiding the optical distortion inherent in the use of concave or cylindrical mirrors for scanning purposes. Since with the mirrored lens elements of my invention the scanning aperture increases with the convexity of the lenses, I am enabled as a consequence to increase within wide limits the total number of scanning elements and thereby the image definition, without necessity for changing the scanning aperture.

Although the ensuing description of the principles of the invention applies more particularly to television receiving apparatus, it will be understood that by merely reversing the scanning process, it may be applied directly to transmitting apparatus.

The scanning apparatus which I employ comprises a rotatable disc having disposed about the periphery thereof at constant radius, a plurality of small convex mirrored lenses, such as referred to. The mirrored surfaces of the lenses are inclined in graduated sequence relative to the plane of rotation of the disc for variably reflecting (in receiving apparatus) a beam from a common light source in successively displaced contiguous paths upon a screen during rotation of the scanning disc.

Each lens element is constructed and positioned to present to the light source a convex anterior surface, preferably of spherical contour, upon which the beam impinges normally, and a mirrored posterior surface which reflects the impinging beam normally through the anterior surface upon the screen. By combining mirror and lens thus in a single unit, I obtain not only variable reflection of the beam for scanning, but also an automatically maintained sharp focus of the beam throughout the extent of a flat image field.

In the preferred embodiment I utilize mirrored lenses which comprise similar sections of a hemisphere. Lenses of this character when employed with certain precautions, are especially adapted to the creation of an image of wide scanning aperture free from optical distortion.

It is known in the art that a sphere of light refracting, transparent material, such as glass, will provide a flat-field image highly corrected for spherical and chromatic aberration, provided the transmitted rays from an object are confined within an aperture of one-third the spherical diameter at the surface and one-fifth the spherical diameter at the center of the sphere. A lens constructed on this principle is known as a Codington lens.

With the Codington lens the object and image are upon opposite sides of the lens. By dividing the sphere into hemispheres and silvering the plane surface of one-half, the undistorted image can be produced upon the same side of the lens as the object. In the television system of the present invention the advantages of the Codington principle are obtained in this fashion by so arranging the lenses upon the scanning disc that the beam from the common source is in each instance directed substantially toward the center of curvature of the spherical surface. By this arrangement it is assured that not only will the entering beam impinge normally upon the spherical surface, but also that the beam will be reflected by the mirrored surface normally through the spherical surface. And this irrespective of the angle of incidence upon the mirrored surface.

This, as is well known, is an optically correct condition for assuring distortionless focusing of the beam upon the screen irrespective of the position of the light source or the angular aperture through which the beam therefrom is variably reflected. To further assure the production of a distortionless image, I focus the light from the common source into a narrow beam converging upon the lens within the Codington aperture of one-third the diameter of the sphere at its spherical surface and preferably also within one-fifth its diameter at the mirrored surface.

It will be observed that the system of my invention thus provides an optically correct distortionless image by employment of simple lens elements, i. e. elements each of which is ground from a single piece of light refracting material. Lenses of this character can be manufactured very cheaply. I thus obtain at a cost comparable to that of existing television systems, apparatus which functions to produce a highly corrected flat field-image, and which is substantially as free from optical distortion as would be obtained by employment of highly corrected compound lenses in all portions of the scanning system.

In the majority of existing television systems the image picture is created by projecting light through apertures in a scanning disc. That is, the light source and resultant image are located upon opposite sides of the scanning device. If the apparatus is to be housed in a cabinet for projection of the image upon a screen located in one side of the cabinet, this arrangement of scanning limits the minimum permissible dimensions of the cabinet.

With my apparatus on the other hand, the light source may be on the same side of the scanning disc with the screen. This permits decreasing the depth of the cabinet by an amount at least equal to the distance from light source to scanning disc in aperture scanning. I thus obtain a much more compact assemblage of the scanning system than has heretofore been possible, taking into account such factors as freedom from distortion and wide scanning aperture. This is a very desirable feature considered from the standpoint of the minimized space requirements available in cabinet mounted television apparatus for home use.

As an additional feature of my invention I propose a refinement whereby the size of the image may be adjusted at will quite independently of the scanning apparatus and the available distance of projection throw to the screen. This result is achieved by interposing in the path of the reflected scanning rays, a single highly corrected compound lens adapted to focus the rays into a flat image-field. To increase the size of the image I thus interpose an amplifying lens, i. e. one having concave effective curvature. To decrease the size of the image a condensing lens, one having convex effective curvature, is employed. By means of this modification the apparatus is rendered very flexible in the hands of the user. Images of different dimensions may be projected upon a screen located at a given distance from the scanner, or the same size image may be projected upon screens at different distances from the scanning equipment.

Having now generally described my invention, reference will be had to the drawing for a more detailed description of its application to a television receiving system. In the drawing:

Fig. 1 is a view in side elevation, partly in section, of the assembled apparatus in situ in a cabinet;

Fig. 2 is a front elevation of the scanning disc illustrative of the manner of mounting the light reflecting lenses;

Figs. 3 and 4 are detail sectional views showing the manner of adjusting the individual lenses for scanning;

Fig. 4 constituting a section along 4—4 of Fig. 3;

Figs. 5–7 are views of an individual lens illustrative of its construction, wherein Fig. 5 shows the lens in front elevation, Fig. 6 in side elevation, and Fig. 7 in section along 7—7 of Fig. 5;

Fig. 8 shows a modified lens construction wherein the rear surface is slightly curved instead of plane as in Fig. 7.

Referring to the drawing, the television apparatus is housed within a cabinet 1 provided at one end with an opening covered by a translucent screen 2 upon which the image is projected. Assuming the television signals received by radio, the necessary tuned receiving, amplifying, and rectifying apparatus is housed in the lower portion of the cabinet as indicated by the rectangle 3. Projecting through the cabinet are control knobs, such as 4, and indicating dials, such as 5, for tuning the system to a desired wavelength. The rectified television signaling currents are applied to a concentrated light source 6, such as a "crater" type neon tube, the intensity of illumination of which fluctuates in correspondence with the signaling currents applied thereto.

A lens 7 adjustable along its axis serves to concentrate light from source 6 upon a succession of light reflecting elements L spaced about the periphery of a rotary scanning disc 8 driven by a motor 9. The reflecting elements L serve to variably direct the focused rays of the light source upon the screen 2 during rotation of the disc 8.

In the preferred embodiment the light reflecting elements L comprise, as stated, similar sections of a hemisphere, positioned with their spherical surfaces anterior or exposed to the light source 6, the opposite or posterior surfaces being preferably mirrored for reflecting the beam from source 6 upon screen 2.

Each lens has a pseudo-trapezoidal contour viewed in front elevation, Fig. 5, a semi-circular configuration viewed in side elevation, Fig. 6, and a pseudo-rectangular outline in transverse section, Fig. 7. The lenses are of such width that a desired number, such as sixty or one hundred and twenty, may be closely spaced about the periphery of disc 8, as shown in Fig. 2, for providing sixty or one hundred and twenty-line scanning as desired. The lateral sides of the lenses are given an appropriate bias, Fig. 5, to permit equal spacing from top to bottom of adjacent lenses when mounted upon the disc.

The individual lenses are adjustably mounted ball and socket fashion in apertures of a face plate 10 of scanning disc. The lenses are maintained in proper relative relation for scanning by means of a rear cover plate 11 through which adjusting screws 12 bearing against the posterior faces of the lenses, are threaded.

From Figs. 3 and 4 it will be observed that three such adjusting screws are provided for each lens, to provide a tripod support wherein the screw adjustments determine uniquely the angular inclinations of the reflecting surfaces of the lenses relative to the plane of rotation of disc 8. The adjustment is such that the angular inclination of each reflecting surface varies in graduated sequence from lens to lens in such fashion that the beam from source 6 will traverse successively displaced contiguous paths upon screen 2 during scanning. The manner of adjustment to this end is clearly depicted in Fig. 1 where lens $L_1$ represents the first lens of the scanning sequence, lens $L_n$ that midway of the sequence, and lens $L_x$ the last lens of the sequence. The inclinations of the intermediate lenses are of course graduated between the indicated limits.

The ball and socket mounting of the lenses assures that rotation providing the requisite angular inclinations of the reflecting surfaces for the individual lenses will take place about the centers of curvature of their spherical surfaces. As a result of this manner of adjustment, the focused beam from source 6 directed toward the circle of centers of the lenses, will impinge normally upon the spherical surface of each lens during rotation of the disc. Moreover, the impinging ray will be reflected at the mirrored surface normally through the spherical surface. This is the optically correct condition to assure distortionless focusing of the light source upon the screen for all positions of the scanning disc and irrespective of the angle of incidence of the impinging ray.

As the disc 8 rotates the lenses L will of course pass successively within the path of the beam from source 6. Moreover, as each lens passes transversely across the path, the beam will be caused to impinge with varying obliquity upon the reflecting surface of the lens and will thus be variably reflected transversely across screen 2, accomplishing thereby one line of the scan. Owing to the construction of the lens and the normal impingement of the beam from source 6 upon the spherical surface thereof, the reflected beam will remain sharply focused upon the screen throughout the extent of the flat image-field.

As a further refinement in avoiding optical distortion, the beam from source 6 impinging upon the lenses is made of narrow aperture, the narrower the better so long as sufficient illumination is maintained. In accordance with the principle of the Codington lens above described, the aperture subtended should not greatly exceed one-third the spherical diameter at the spherical surface or one-fifth the diameter at the reflecting surface.

With a given set-up of the optical system the image-field will, of course, have rather well defined limiting dimensions as indicated by the dotted lines 13, Fig. 1. If now it is desired to change the size of the picture independently of the scanning equipment, this may be accomplished by interposing in the path of the variably deflected scanning beam, an additional lens 14, preferably of the compound type corrected to provide a flat-field distortionless image. An amplifying lens of the concave effective curvature shown, thus interposed, would increase the size of image to that indicated by dashed lines 15; whereas a condensing lens of convex effective curvature would decrease the angular aperture. When such an additional lens 15 is employed, it is of course necessary to readjust the position of lens 7 with respect to source 6 sufficiently to provide a sharp focus upon screen 2.

The lenses L need not be true sections of a hemisphere. It may be expedient in certain apparatus to decrease the lens thickness to less than one-half the spherical diameter, or to accord a slight curvature to the posterior reflecting surfaces, as shown in Fig. 8, or to employ a combination of these modifications. Again it may be desirable to employ lenses having cylindrical instead of spherical curvature.

Changing the reflecting surface of the lens from plane, Fig. 7, to slightly curved or spherical, Fig. 8, increases the angle through which the incident beam is deflected for a given transverse movement of the scanning disc past the light source. This has the advantage that the same size of image field may be obtained from lenses of decreased width. By this expedient therefore an increased number of lenses can be mounted upon a scanning disc of given diameter. Since the number of lines per scan is equal to the number of lenses employed, increased image refinement and delineation may be obtained in this manner without otherwise modifying the apparatus.

Owing to the compact construction and efficient optical action of the mirrored-lenses such as I employ, I am enabled greatly to decrease the diameter of the scanning disc as compared to that required for aperture scanning with lenses. Utilizing hemispherical lenses with plane mirrored surfaces I have constructed a sixty line scanning disc of only eight inches in diameter which will provide an image-field of 12 inches in height at a distance of 12 inches from the scanning disc. By according the mirrored surfaces a spherical curvature of about six times the radius of curvature of the spherical surface, I am enabled to increase the number of scanning lines to one hundred and twenty without otherwise affecting the system or the introduction of optical distortion.

It will be observed that with the lenses of my invention it is possible to obtain with a "simple" lens, i. e. one made of a single refracting element, a corrected flat field-image of aperture comparable to that otherwise obtainable only with high grade lenses of the "compound" type embodying a combination of two or more light refracting elements. This, as referred to, represents a decided economy as lenses of my construction can be made at but a small fraction of the cost of a compound lens.

Although the reflecting surfaces of the lenses are preferably mirrored, it is not essential that this be done. That is, it is perfectly feasible to so locate the light source and screen relative to the posterior lens surfaces, that the incident beam will at all times impinge at greater than critical angle, resulting in total internal reflection. For such operation the lenses might be mounted at the extreme periphery of the scanning disc with their mirrored surfaces at an angle of the order of forty-five degrees to the plane of rotation. The light source being then located substantially in the plane of rotation would cause the reflected beam to be directed toward the screen with the arrangement of Fig. 1.

The source 6 with this modification could be located outside the limits of disc 8, or adjacent its center, the latter arrangement being particularly adapted to compact assembly in cabinet housing.

In my system curvature of the paths traversed by the scanning beam in the image-field due to curvature of the scanning disc, may be corrected by directing the incident beam from source 6 upon the mirrored surfaces slightly above their line of centers, Fig. 1. This correction cannot be made in aperture scanning systems such as have come to my attention.

In order to employ the assembly of Fig. 1 for the transmitting portion of a television system, it is only required to replace screen 2 by an object to be scanned, the element 6 then constituting a photo-electric cell. With these modifications rotation of the scanning disc would cause the mirrors L to direct light, scanning fashion, from successive elements of the object plane upon the photo-electric cell 6, fluctuations of light intensity thereon being converted by the cell into corresponding variations of signaling current. The interposed lens 14 would then serve to bring the rays emanating from all portions of the image plane to a sharp focus upon the pohto-electric cell 6.

If lens 7, Fig. 1, is so adjusted that the image of source 6 is focused just outside the focal length of lenses $L_n$, the reflected rays from these lenses will converge so gradually to a focus that the setting of screen 2 relative to the scanning disc is not at all critical. This is of decided advantage in correcting for any residual distorting effects of the optical system due to curvature of the image-field. It becomes of especial advantage in transmitting, by correcting for perspective in a scanned object.

It will be observed that with the system of my invention the scanning angle or aperture is in general determined only by the effective convexity of the lens elements L, and not by the angle subtended thereby upon the scanning disc, as is the case with plane mirror scanning elements. Owing to this circumstance, I am enabled with my system to increase the image definition at will and without change of the scanning aperture or dimensions of the lens elements, by merely increasing the diameter of the scanning disc. This results from the increased number of lens elements which may thus be disposed about the periphery of the scanning disc.

I may, however, by proper location of the lens elements L either increase or decrease the scanning aperture of the lens element proper by an amount substantially double the angle which they individually subtend upon the scanning disc. Thus it will become apparent that if I rotate each of the lenses sufficiently to provide in effect drum scanning, the scanning aperture will be increased or decreased to the extent stated dependent upon whether the mirrored surfaces are directed away from or toward the center of the scanning disc.

I claim:

1. Television apparatus comprising a movable scanning member having a plurality of light reflecting convex lens elements arranged thereon in graduated relation to variably reflect and focus a beam from a common light source in successively displaced parallel paths during scanning movement of said member.

2. Television apparatus comprising a light source, a movable scanning member, a plurality of light reflecting convex lens elements arranged thereon in graduated sequence to variably reflect light from said source in successively displaced paths during scanning movement of said member, and means for focusing said light source successively upon said reflecting elements during scanning.

3. Television apparatus comprising a rotatable disc having disposed about the periphery thereof at a constant radius, a plurality of light reflecting convex lens elements arranged thereon in graduated sequence to variably reflect a beam from a common light source in successively displaced parallel paths during rotation of said disc.

4. Television apparatus comprising a rotatable disc having disposed about the periphery thereof at a constant radius, a plurality of light reflecting convex lens elements arranged with their reflecting surfaces inclined in graduated sequence relative to the plane of rotation of said disc for variably deflecting a beam from a common light source in successively displaced parallel paths during rotation of said disc.

5. Television apparatus comprising a rotatable disc having disposed about the periphery thereof at constant radius, a plurality of mirrored convex lens elements arranged with their mirrored surfaces inclined in graduated sequence relative to the plane of rotation of said disc for variably reflecting light from a common source in successively displaced parallel paths during rotation of said disc and for focusing said reflected rays in a plane image-field.

6. Television apparatus comprising a rotatable scanning disc having disposed about the periphery thereof at constant radius, a plurality of plano-convex lenses arranged with their convex surfaces anterior to a common light source and with their plane surfaces mirrored and inclined in graduated sequence relative to the plane of rotation of said disc for variably reflecting light from said source in successively displaced parallel paths during rotation of said disc and for focusing said rays substantially free of optical distortion in a flat image-field.

7. Television apparatus comprising a rotatable scanning disc having disposed about the periphery thereof at constant radius, a plurality of plano-convex lenses comprising similar sections of a hemisphere arranged with their convex surfaces anterior to a common light source and with their plane surfaces mirrored and inclined in graduated sequence relative to the plane of rotation of said disc for variably reflecting light from said source in successively displaced parallel paths during rotation of said disc, a screen positioned to intercept said reflected rays, and lens means interposed between said source and said disc adjustable to focus said reflected rays upon said screen.

8. Television apparatus comprising a rotatable scanning disc having a plurality of means spaced about its periphery relatively arranged to reflect a beam from a common light source in successively displaced contiguous paths during rotation of said disc, each said means comprising a lens having a convex surface upon which said beam impinges, and a mirrored surface arranged to reflect said beam through said convex surface.

9. Television apparatus comprising a rotatable scanning disc having a plurality of means spaced about its periphery relatively arranged to reflect a beam from a common light source in successively displaced contiguous paths during rotation of said disc, each said means comprising a lens having a surface of convex spherical contour upon which said beam impinges normally and an opposite surface arranged to reflect said impinging beam normally through said anterior surface whereby said lenses provide an undistorted focused image of said source as said beam is variably reflected therefrom.

10. Television apparatus comprising a rotatable scanning disc having a plurality of means spaced about its periphery relatively arranged to reflect a beam from a common light source in successively displaced contiguous paths during rotation of said disc, each said means comprising a lens having a convex spherical surface upon which the beam from said source impinges normally and a plane mirrored surface at which said impinging beam is reflected normally through said spherical surface, whereby said lenses provide an undistorted focused image of said source as said beam is variably reflected therefrom.

11. Television apparatus comprising a rotatable scanning disc having a plurality of means spaced about its periphery relatively arranged to reflect a beam from a common light source in successively displaced contiguous paths during rotation of said disc, each said means comprising a lens constituting section of a hemisphere upon the spherical surface of which the beam from said source impinges normally, the opposite plane surface being arranged to reflect said impinging beam normally through said spherical surface, whereby said beam is focused to provide an undistorted plane image-field during scanning.

12. Television apparatus comprising a rotatable scanning disc having a plurality of means spaced about its periphery relatively arranged to reflect a beam from a common light source in successively displaced contiguous paths during rotation of said disc, each said means comprising a lens constituting a section of a hemisphere upon the spherical surface of which the beam from said source impinges normally, the opposite plane surface being arranged to reflect said impinging beam normally through said spherical surface, the said impinging beam subtending an aperture at the spherical surface not exceeding one-third the diameter of the said spherical surface, whereby the said beam variably reflected by said lenses is focused to provide an undistorted flat-field image during scanning.

13. Television apparatus comprising a rotatable scanning disc having a plurality of means spaced about its periphery relatively arranged to reflect a beam from a common light source in successively displaced contiguous paths during rotation of said disc, each said means comprising a lens constituting a section of a hemisphere upon the spherical surface of which the beam from said source impinges normally, the opposite plane surface being arranged to reflect said impinging beam normally through said spherical surface, the said impinging beam being such as to subtend apertures at the spherical and reflecting surfaces not exceeding one-third and one-fifth respectively of the diameter of said spherical surface, whereby the beam variably reflected from said lenses is focused to provide an undistorted flat-field image during scanning.

14. Television apparatus comprising a rotatable scanning disc having a plurality of means spaced about its periphery relatively arranged to reflect a beam from a common light source in successively displaced contiguous paths during rotation of said disc, each said means comprising a lens having a convex surface of spherical curvature upon which the beam from said source impinges normally, and an opposed mirrored surface of lesser spherical curvature at which said impinging beam is reflected through said anterior surface, whereby the beam variably deflected by said lenses is focused to provide an undistorted flat-field image of wide aperture during scanning.

15. Television apparatus comprising a rotatable scanning disc having a plurality of means spaced about its periphery relatively arranged to reflect a beam from a common light source in successively displaced contiguous paths during rotation of said disc, each said means comprising a lens having a convex spherical surface upon which the beam from said source impinges normally, and an opposed surface of lesser spherical curvature at which said impinging beam is reflected normally through said anterior surface, the depth of said lens being substantially that of the radius of curvature of said spherical surface, whereby the beam variably deflected from said lenses is focused to produce a substantially undistorted flat-field image during scanning.

16. In a television receiving system, the combination of a screen for receiving a projected image, scanning means positioned at a constant distance from said screen and employing convex mirrored lenses as scanning elements for creating said image by variable reflection of a light beam on said screen, and focusing means interposed in the path of said beam for optionally controlling the size of said image.

17. In a television receiving system, the combination of a screen for receiving a projected image, scanning means positioned at a constant distance from said screen and employing convex mirrored lenses as scanning elements for creating said image by variable reflection of a light beam on said screen, and an amplifying lens interposed in the path of said beam for increasing the size of said image.

18. In a television receiving system, the combination of a screen for receiving a projected image, scanning means positioned at a constant distance from said screen and employing convex mirrored lenses as scanning elements for creating said image by variable reflection of a light beam on said screen, and a condensing lens interposed in the path of said beam for reducing the size of said image.

19. Television apparatus comprising a movable scanning member having a plurality of light reflecting convex lens elements arranged thereon in spaced relation, the so arranged lens elements having their posterior surfaces mirrored and relatively inclined in graduated sequence for effecting scanning in successively displaced parallel paths during scanning movement of said member.

20. Television apparatus comprising a rotatable disc having disposed about the periphery thereof at constant radius, a plurality of light reflecting convex lens elements, the so disposed lens elements having their posterior surfaces mirrored and inclined in graduated sequence relative to the plane of rotation of said disc for effecting scanning in successively displaced parallel paths during rotation of said disc.

21. Television transmitting apparatus comprising a rotatable disc having disposed about the periphery thereof at constant radius, a plurality of light reflecting convex lens elements, the so disposed lens elements having their posterior surfaces mirrored and inclined in graduated sequence relative to the plane of rotation of said disc, for reflecting and focusing upon a common light sensitive element, light from successively displaced areas of a scanned object during rotation of said disc.

WILLIAM HOYT PECK.